July 4, 1950 — G. W. SODERMAN — 2,514,099
LOADING APPARATUS

Filed Oct. 20, 1948 — 4 Sheets-Sheet 1

INVENTOR
G. W. SODERMAN
BY W. C. Parnell
ATTORNEY

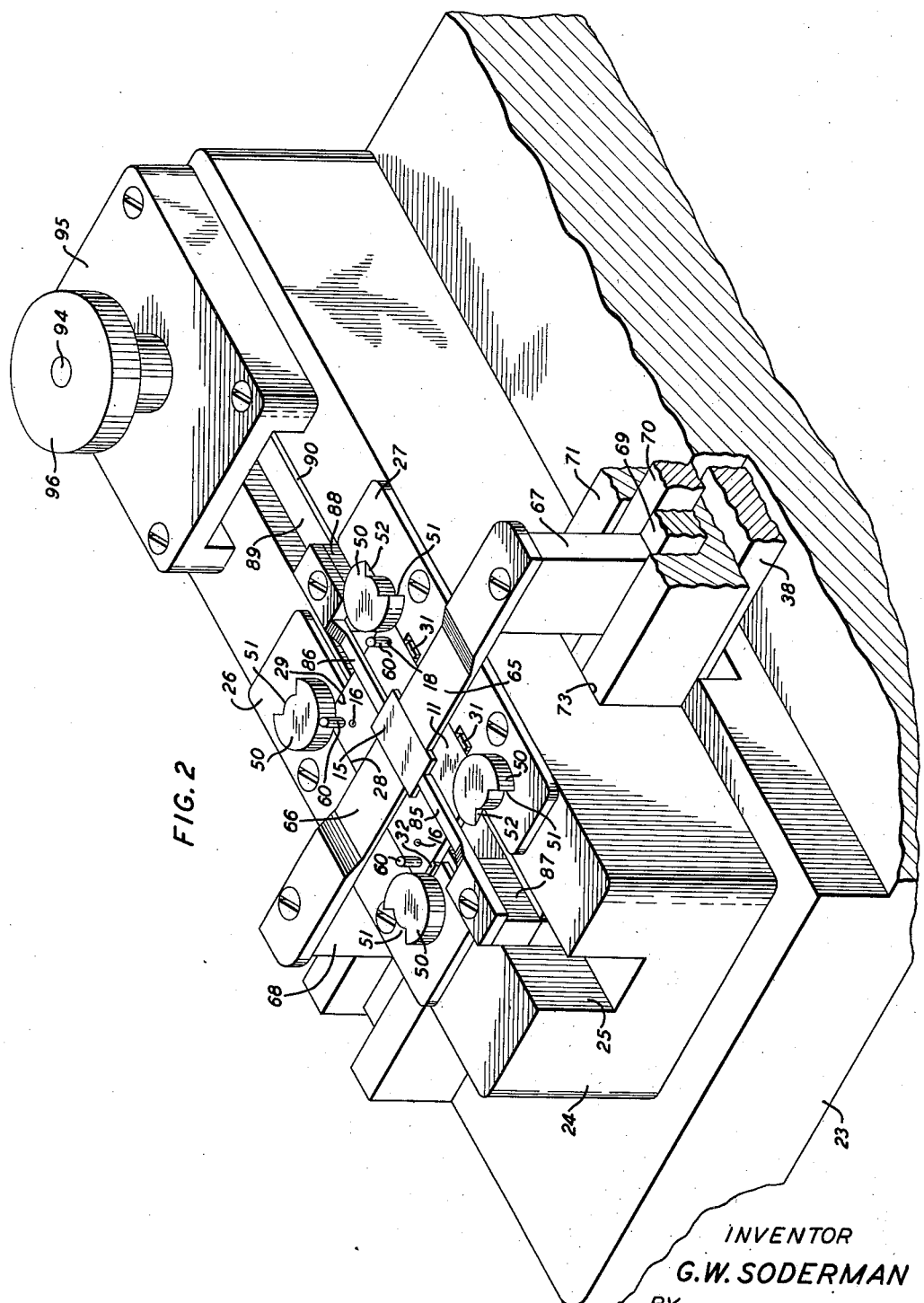

July 4, 1950          G. W. SODERMAN          2,514,099
LOADING APPARATUS
Filed Oct. 20, 1948          4 Sheets-Sheet 3
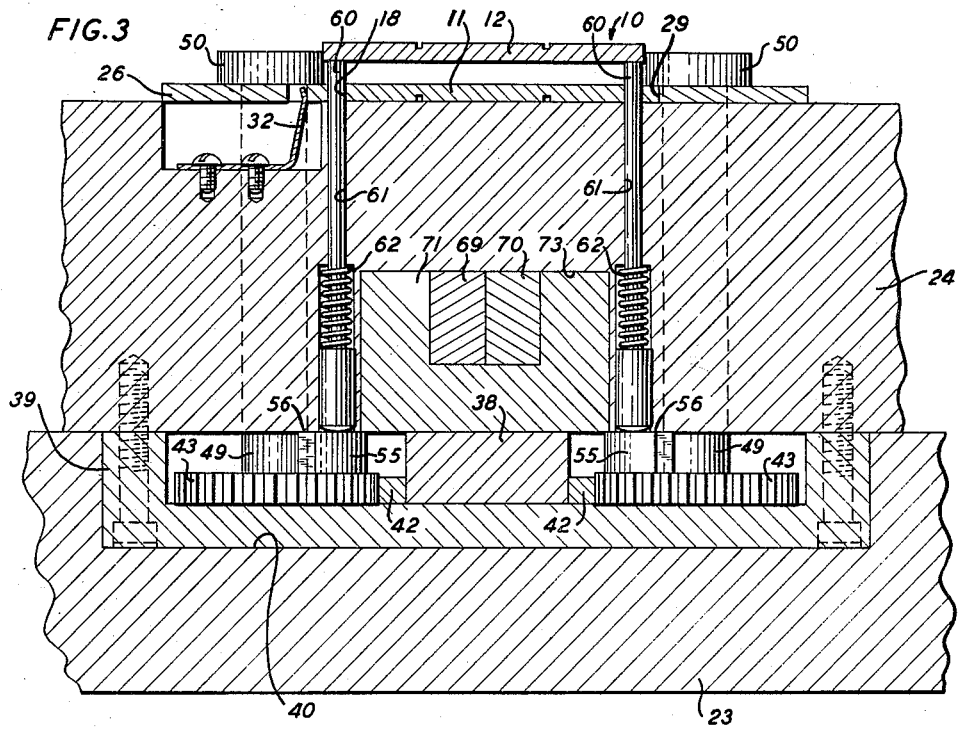
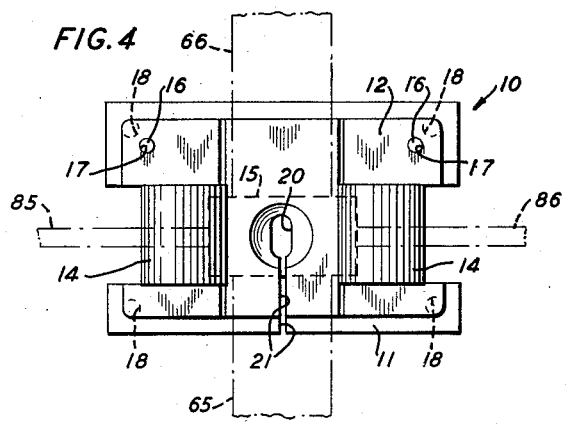
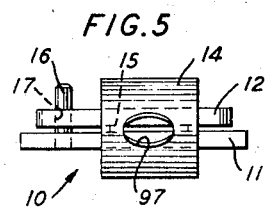
INVENTOR
G. W. SODERMAN
BY
*W. C. Parnell*
ATTORNEY July 4, 1950  G. W. SODERMAN  2,514,099
LOADING APPARATUS
Filed Oct. 20, 1948  4 Sheets-Sheet 4

INVENTOR
G. W. SODERMAN
BY
[signature]
ATTORNEY

Patented July 4, 1950

2,514,099

UNITED STATES PATENT OFFICE 2,514,099

LOADING APPARATUS

George W. Soderman, West Englewood, N. J., assignor to Western Electric Company, Incorporated, New York, N. Y., a corporation of New York Application October 20, 1948, Serial No. 55,578

7 Claims. (Cl. 29—203)

This invention relates to loading apparatus, and more particularly to apparatus for loading articles such as fragile synthetic crystal plates in holders for subsequent soldering of lead wires thereto.

Due to the scarcity of quartz suitable for use in the communication arts, a synthetic crystal commercially known as EDT crystals, grown in a solution of ethylene diamine tartrate, has been adopted for use in certain electrical units as a suitable substitute. The introduction of this synthetic crystal into the electrical units has necessitated the conception of new mechanisms and processes as the machinery and processes formerly employed in the manufacture of quartz crystal units could no longer be used.

In applicant's copending application, Serial No. 55,577, filed October 20, 1948, a holding apparatus for the synthetic crystal is disclosed, this holding apparatus being designed to protect the synthetic crystal plate from mechanical abuse and to act as a thermal-reservoir during heating and cooling cycles, in the process of soldering leads to the synthetic crystal plate, to protect the plate from thermal-shock. The holding apparatus includes companion plate-like members recessed at their ends to receive split cylindrical springs which normally urge the members toward each other to hold the members in uniform pressure contact with the crystal plate. A new problem, therefore, arises in efficiently loading the fragile article, or synthetic crystal plate, centrally within the holder whereby desired portions of the opposing faces of the crystal will be exposed and aligned with means for soldering lead wires to these portions during the soldering processes.

An object of the invention is to provide a loading apparatus which is simple in structure, readily actuable and highly efficient in centrally locating an article within a holder therefor.

With this and other objects in view, the invention comprises a loading apparatus for loading an article in a holder having superimposed members normally urged toward each other, the apparatus including a recessed portion for one of the members, means to force them away from each other for the placing of an article therebetween, and pairs of locating fingers actuable simultaneously to center the article with respect to the members.

More specifically, the apparatus has recessed locating elements to receive the lower member of the holder, the recesses having two locating surfaces against which the lower member of the article is forced by the aid of springs to accurately locate the article in the apparatus. A hand lever actuates a rack which in turn rotates a plurality of pinions simultaneously, these pinions driving shafts on the upper ends of which latches are mounted to ride over the corners of the lower member of the holder to firmly latch it within its recess. Cams are mounted on the pinions and positioned to actuate spring pressed reciprocable elements, moving the elements vertically to raise the upper member of the holder a given distance above the lower member thereof, after the lower member has been latched in its recess. The article to be loaded in the holder may then be disposed upon one of the locating elements, after which one set of locating fingers is actuated, through the rotation of a hand wheel, rotating a gear to move racks, supporting the fingers, in opposite directions simultaneously to accurately position the article along a given centerline of the holder. Another set of locating fingers are then actuated through a similar mechanism including a hand wheel, a gear and racks supporting the fingers moving the fingers simultaneously toward each other to centrally position the article along a centerline at right angles to the first centerline. The article is now centrally located within the holder and the locating fingers may be returned to their normal positions. The hand lever is then returned to its normal position to first lower the spring pressed reciprocable elements to lower the upper member of the holder on to the article and then free the holder for removal from the apparatus by moving the latches free of the lower member.

Other objects and advantages will be apparent from the following detailed description when considered in conjunction with the accompanying drawings, wherein:

Fig. 2 is an enlarged isometric view of a portion of the apparatus illustrated in Fig. 1;

Fig. 3 is an enlarged vertical sectional view taken along the line 3—3 of Fig. 1;

Fig. 4 is a top plan view of the work holder illustrating the effect of the locating fingers centrally positioning the article with respect to the apertures in the members of the holder;

Fig. 5 is an end elevational view of the article holder with the article positioned therein.

Figure 1:
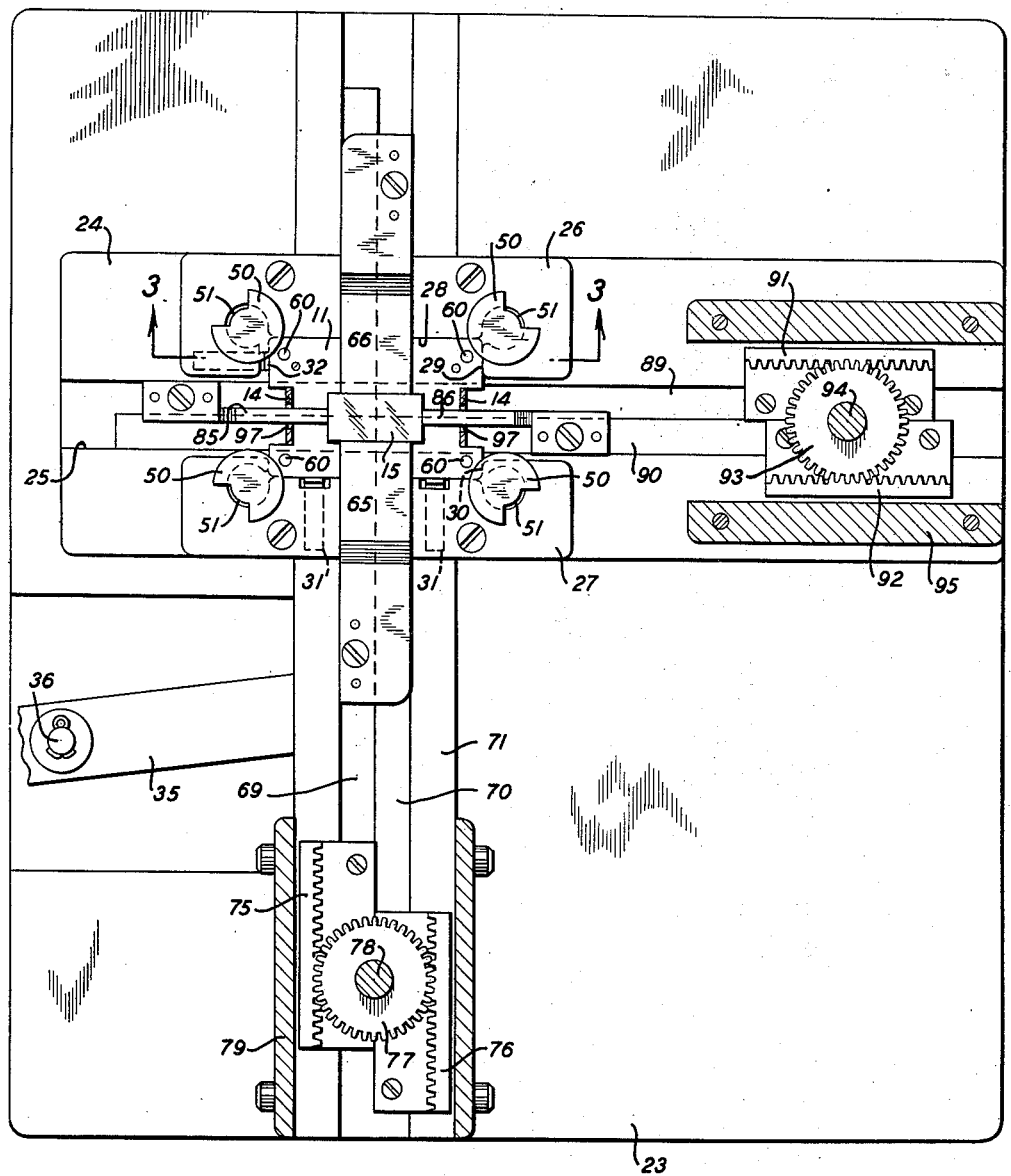
Fig. 1 is a top plan view of the apparatus, portions thereof being removed to illustrate the detailed structures therebeneath.

Referring now to the drawings, attention is first directed to Figs. 4 and 5 which illustrate the work holder indicated generally at 10 composed of a main or lower member 11 and an upper member 12. The members 11 and 12 have recesses in the ends thereof to receive split cylindrical springs 14 which normally urge the members toward each other to apply uniform pressure to an article 15 when disposed therebetween. In the present embodiment of the invention, the article is a fragile structure, commercially known as a synthetic or EDT crystal. The main member 11 carries pins 16 projecting through apertures 17 in the companion member and cooperating with the springs 14 in accurately positioning the companion member with respect to the main member. Apertures 18 are formed in the main member 11 and disposed adjacent the corners of the companion member 12 for a purpose hereinafter described. Both members 11 and 12 are provided with apertures 20 and connecting slots 21 extending through adjacent sides of the members through which the lead wires may be moved after they have been soldered to the article 15.

The apparatus for loading the articles 15 in holders 10 includes a base 23 upon which a main support 24 is mounted. The support 24 is longitudinally grooved at 25 and provided with locating elements 26 and 27 mounted upon the spaced upper surfaces of the support. The locating elements 26 and 27 have recesses in their inner edges providing locating surfaces 28 and 29 of the member 26 and 30 of the member 27 against which one side and one end of the lower member 11 of the holder 10 may be forced by springs 31 and 32 respectively when the holder is disposed in the recesses of the locating elements.

After the holder 10 is disposed in the proper position, in the apparatus, mechanisms are actuable to first latch the holder in position and subsequently move the companion member 12 upwardly free of the lower member 11. This mechanism includes a hand lever 35 pivoted at 36 and having its inner end connected at 37 to a double rack 38. The rack 38 is disposed beneath the support 24 and rests upon a plate 39 disposed in a recess 40 of the base 23 as illustrated in Fig. 3. Teeth 42 disposed upon opposite sides of the rack interengage pinions 43. The pinions are fixedly mounted on the lower ends of shafts 49 which are suitably journalled in the support 24 extending upwardly therethrough and having cam-like latches 50 mounted on the upper ends thereof. The latches 50 have cutaway portions 51 which are normally adjacent the corners of the recesses in the locating elements 26 and 27. The latches 50 are of given thicknesses with flat upper surfaces, their under surfaces beyond the shafts 49 having undercut leading portions 52 assuring movement of the latches over the corners of the lower member of the holder. With this arrangement, the latches, normally positioned with their cutaway portions 51 adjacent the corners of the recesses in the locating elements 26 and 27, may, when rotated simultaneously extend over the lower member 11 of the holder until they are in the positions shown in Figs. 1 and 2 where they jointly hold the lower member firmly in its recesses.

Figure 6:
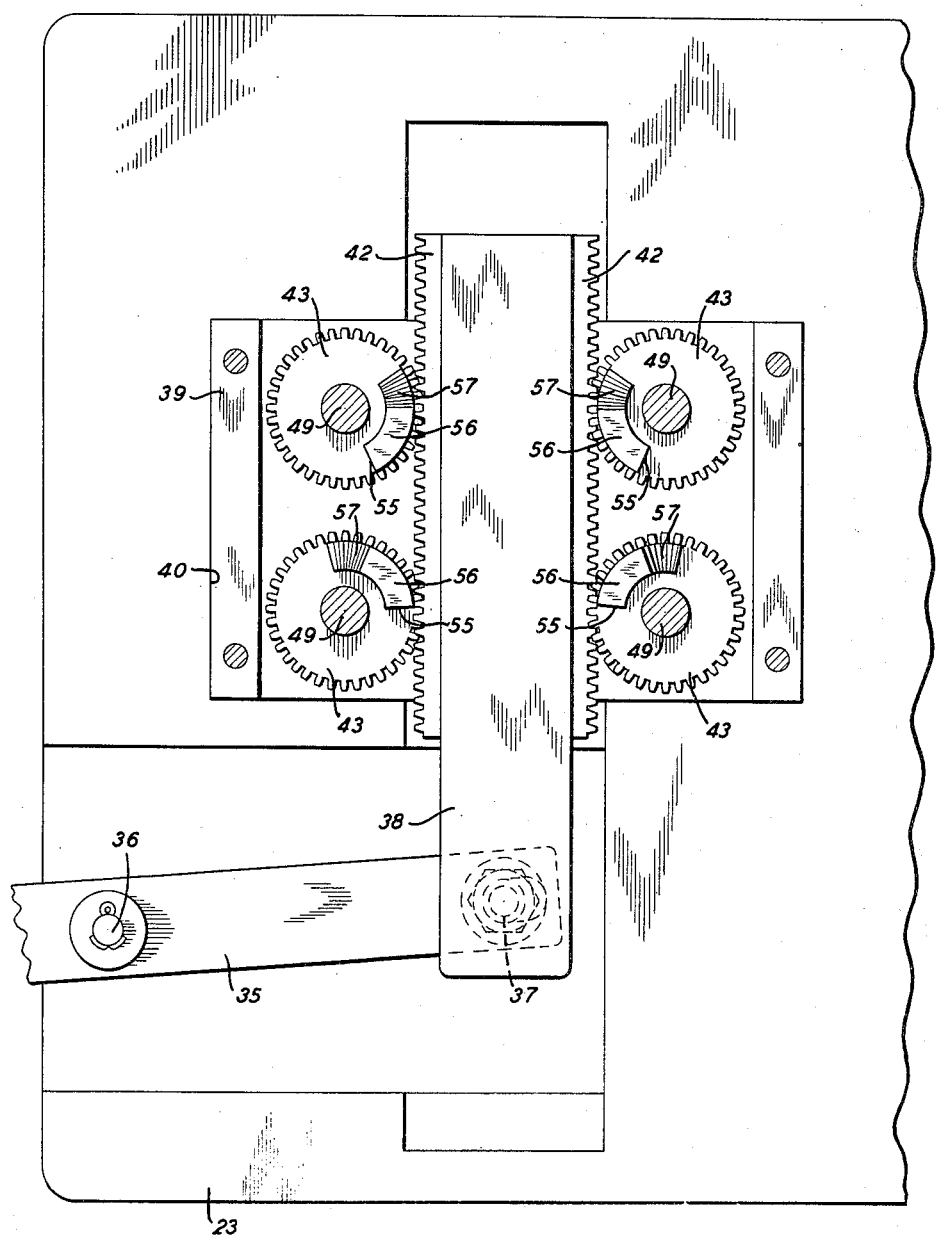
Fig. 6 is an enlarged fragmentary sectional view of a part of the actuating mechanism of the apparatus.

Some of the mechanism just described for latching the holder in place, particularly the lower member thereof, is utilized in moving the companion member 12 vertically free of the lower member of the holder. The additional mechanism includes cams 55 having rising portions 56 and high portions 57 mounted upon the pinions 43 as illustrated in Figs. 3 and 6. Reciprocable elements 60, disposed in vertical apertures 61 of the support 24 and normally urged downwardly by their springs 62, have their lower ends positioned to be engaged by the cams 55 at given portions of the cycles of rotation of their pinions 43 whereby the cams in riding beneath the elements 60 will move them vertically against the forces of their springs 22 to move their upper ends through the apertures 18 of the companion member 12 moving it free of the lower member 11 of the holder as illustrated in Fig. 3 after the latches 50 have been moved a given distance to latch the lower member 11 of the holder against displacement.

Fingers 65 and 66 of the contours shown, particularly in Figs. 1 and 2 are mounted on vertical members 67 and 68 respectively, these members being mounted upon reciprocable elements 69 and 70. The reciprocable elements 69 and 70 are disposed in parallel alignment in a U-shaped guide 71 extending through a transversely extending aperture 73 in the support 24. The guide 71 cooperates with the member 39 in providing a guided path for the rack 38. It will be noted by viewing Figs. 1 and 2 that the U-shaped guide 71 extends beyond the support 24 to support and guide the reciprocable elements between their normal and operated positions. Racks 75 and 76 are mounted upon adjacent ends of the element 69 and 70, the racks interengaging a pinion 77 which is fixedly mounted upon a shaft 78 journalled in a cover 79 and having a hand wheel (not shown) mounted on the upper end thereof. The fingers 65 and 66 are positioned closely adjacent the upper surfaces of their respective locating elements 27 and 26 respectively and also the upper surface of the lower member 11 of the holder 10 when the holder is disposed upon the upper surface of the support 24 in the recesses of the locating elements. In this manner, the locating fingers 65 and 66 may move an article 15 from a position on either of the locating elements 26 or 27 to the predetermined position between the members 11 and 12 of the holder which may be termed the longitudinal centerline of the holder extending through the centerlines of the apertures 20 thereof.

Guide fingers 85 and 86 similar in structure to the guide fingers 65 and 66 but smaller in width, are mounted upon vertical members 87 and 88, these vertical members in turn being mounted upon reciprocable elements 89 and 90. The reciprocable elements 89 and 90 are mounted to slide in the longitudinal groove 25 of the support 24 and have racks 91 and 92 mounted on adjacent ends thereof. A pinion 93 positioned between the racks 91 and 92 interengages the teeth thereof and is fixedly mounted upon a shaft 94 which extends vertically through a cover 95 where it is journalled for rotation about its axis. A hand wheel 96 is fixedly mounted upon the upper end of the shaft 94 whereby the shaft may be rotated manually in either direction to simultaneously reciprocate the elements 89 and 90 through the pinion 93 and racks 91 to move the fingers 95 and 96 between their normal positions away from the holder 10 to their locating positions as illustrated in Figs. 1 and 2 where they locate the article 15 centrally with respect to the horizontal centerline of the article. It will be noted by viewing Figs. 1 and 5 that apertures 97 are formed in the cylindrical springs 14 providing passageways for the fingers 95 and 96 between the members 11 and 12 of the holder 10. The hand wheel for operating the shaft 78 is identical with the hand wheel 96, these hand wheels with their finger operating mechanisms being disposed where the operator may actuate both of them simultaneously if he so desires.

Considering now the operation of the apparatus, let it be assumed that the apparatus is in its normal position at which time the hand lever 35 is at its initial position with the cams 55 on the pinions 43 positioned away from the reciprocable elements 60 allowing the elements to assume their normal positions with their upper ends below the upper surface of the support 24. At the same time, the latches 50 are in their normal positions with the open portions 51 thereof disposed adjacent the corners of the recesses in the locating elements 26 and 27. Furthermore, the locating fingers 65 and 66, as well as the locating fingers 85 and 86 are in their normal positions spaced beyond the cavity in which a holder 10 will be disposed. The locating fingers 65 and 66 will have their article engaging edges positioned substantially upon but short of the outer edges of their respective locating elements 27 and 28. In this manner, the operator may place the article 15 upon either locating element 26 or 27 in front of either locating finger 65 or 66.

The holder 10, which is to receive the article, is placed upon the support 24 in the proper position in the recesses of the locating elements 26 and 27, the springs 31 and 32 urging the holder 10 against the locating surfaces 28, 29 and 30 of the locating elements. If desired, the article 15 may be disposed in front of either locating fingers 65 or 66 before or after the holder is located in the apparatus. The lever 35 may be actuated from its normal position into the position shown in Fig. 6 causing longitudinal movement of the rack 38 to rotate the gears 43 with their shafts 49. Rotation of the shafts 49 will cause the latches 50 to rotate into their latching positions over the corners of the lower member 11 to firmly hold the lower member against movement. After the latches 50 have been rotated sufficiently, to hold the member 11 in place, the cams 55 on the gears 43 will move beneath their reciprocable elements 60, moving them upwardly against the forces of their spring 62 to the positions shown in Fig. 3, the elements in their upward movement extending through the apertures 18 of the lower member 11 engaging the corners of the upper member 12 of the holder and moving it upwardly against the forces of the cylindrical springs 14 to the position shown in Fig. 3.

If the article 15 has not heretofore been located in front of either locating fingers 65 or 66, it may be so located at this time. The operator may now actuate the hand wheel mounted on the shaft 78 to rotate the shaft in a direction to cause the locating fingers 65 and 66 to move simultaneously toward the longitudinal centerline of the holder 10 causing movement of the article until its longitudinal centerline is coincident with the longitudinal centerline of the holder. The operator now actuates the hand wheel 96 rotating the pinion 93 to move the racks 91 and 92 in opposite directions moving their reciprocable elements 89 and 90 within the groove 25 of the support 24 to move the locating fingers 85 and 86 toward each other through the apertures 97 in the springs 14 until their inner ends engage and locate the article 15 with its horizontal centerline coincident with the horizontal centerline of the holder 10. When the locating fingers 65 and 66 have been operated to locate the article 15 within the holder 10, it is preferred that they do not firmly grip the article until the locating fingers 85 and 86 have performed their function, after which suitable force may be applied to both actuating mechanisms for the locating finger to assure central location of the article within the holder. When this has been accomplished, the locating fingers are returned to their normal positions, by operation of their shafts 78 and 94 in the oppostie directions, removing the fingers from between the members 11 and 12 of the holder 10. At this time, the actuating lever 35 may be moved to its normal position causing the cams 55 to move from beneath the elements 60 allowing the elements to gradually move downwardly under the forces of their springs 62 until the companion member 12 of the holder 10 rests upon the article 15 with a uniform pressure derived from the cylindrical springs 14. The plungers 60 are removed completely from the apertures 18 in the holder and after the companion member 12 comes to rest upon the article 15, the latches 50 are freed of the lower member 11 by positioning the open or cutaway portions 51 thereof adjacent the corners of the member 11. The holder with the article may now be removed from the apparatus and the apparatus is in position to receve another holder and to locate another article 15 therein.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for loading an article in a predetermined position between superimposed members of a holder which are normally urged toward each other to hold the article therebetween, the apparatus comprising a support, means to locate the holder at a given position on the support, means to hold one of the members of the holder against movement, means to move the other member of the holder away from the held member thereof, and fingers actuable in synchronism relative to a given location on the held member to centrally position the article thereon.

2. An apparatus for loading an article in a predetermined position between superimposed members of a holder which are normally urged toward each other to hold the article therebetween, the apparatus comprising a support, means to locate the holder at a given position on the support, means to hold one of the members of the holder against movement, means to move the other member of the holder away from the held member thereof, one set of fingers actuable in synchronism relative to a given centerline of the held member to locate the article relative thereto, and another set of fingers disposed at right angles to the first set of fingers and actuable in synchronism relative to a second centerline disposed at right angles to the given centerline to locate the article relative thereto.

3. An apparatus for loading an article in a predetermined position between superimposed members of a holder which are normally urged toward each other to hold the article therebetween, the apparatus comprising a support, a locating element having surfaces to be engaged by a side and an end of the lower member of the holder, resilient members positioned to engage the other side and end of the lower member of the holder to force the first mentioned side and end of the lower member of the holder against their respective locating surfaces, means to lock the located lower member of the holder against movement, means to move the upper member of the holder away from the lower member, and fingers actuable in synchronism relative to a given location on the lower member to centrally position the article thereon.

4. An apparatus for loading an article in a predetermined position between superimposed members of a holder which are normally urged toward each other to hold the article therebetween, the apparatus comprising a support, an element on the support to locate the holder at a given position thereon, a latch normally disposed free of the said position and actuable to engage the lower member of the holder to latch it in the said position, a reciprocable element carried by the support and normally disposed away from the said position, an operating mechanism operable to first actuate the latch and then the reciprocable element to move the upper member of the holder away from the lower member thereof while the lower member is latched against movement, and means to locate an article at a predetermined position on the lower member.

5. An apparatus for loading an article in a predetermined position between superimposed members of a holder which are normally urged toward each other to hold the article therebetween, the apparatus comprising a support, an element on the support to locate the holder at a given position thereon, a latch normally disposed free of the said position and actuable to engage the lower member of the holder to latch it in the said position, a reciprocable element carried by the support and normally disposed away from the said position, an operating mechanism operable to first actuate the latch and then the reciprocable element to move the upper member of the holder away from the lower member thereof while the lower member is latched against movement, and means to locate an article at a predetermined position on the lower member, the said operating mechanism being further operable to cause the reciprocable element to return to its normal position, whereby the upper member may be lowered onto the article disposed between the members, and to thereafter move the latch free of the lower member of the holder to free the holder.

6. An apparatus for loading an article in a predetermined position between superimposed members of a holder which are normally urged toward each other to hold the article therebetween, the apparatus comprising a support, an element on the support to locate the holder at a given position thereon, a latch normally disposed free of the said position and actuable to engage the lower member of the holder to latch it in the said position, a reciprocable element carried by the support and normally disposed away from the said position, an operating mechanism operable to first actuate the latch and then the reciprocable element to move the upper member of the holder away from the lower member thereof while the lower member is latched against movement, and sets of locating fingers actuable in a given sequence to move an article between the members of the holder and locate it at a predetermined position on the lower member.

7. An apparatus for loading an article in a predetermined position between a lower and an upper member of a holder which members are normally urged toward each other to hold the article therebetween, the lower member of the holder being longer than the upper member and having spaced apertures therein, the loading apparatus comprising a support with longitudinal and lateral grooves therein, locating elements formed with recesses to receive the lower member of the holder, cam-like latches having cutaway portions normally disposed adjacent the recesses in the locating elements and movable about their axes over the recesses and the lower member of the holder when disposed therein to latch the lower member in the recesses, reciprocable elements carried by the support in alignment with the apertures of the said lower member when disposed in the recesses, an operable mechanism including pinions to drive the latches into their latching positions, cams driven with the pinions to simultaneously move the reciprocable elements vertically through the said apertures to move the upper member a given distance above the lower member, sets of fingers, sets of reciprocable members disposed in their respective grooves of the support, and means to reciprocate the sets of members in a selected sequence to move the article between the members and center it therebetween.

GEORGE W. SODERMAN.

No references cited.